Dec. 8, 1959  B. F. GARDNER  2,916,331
FLEXIBLE WHEEL
Filed July 16, 1958  2 Sheets-Sheet 1
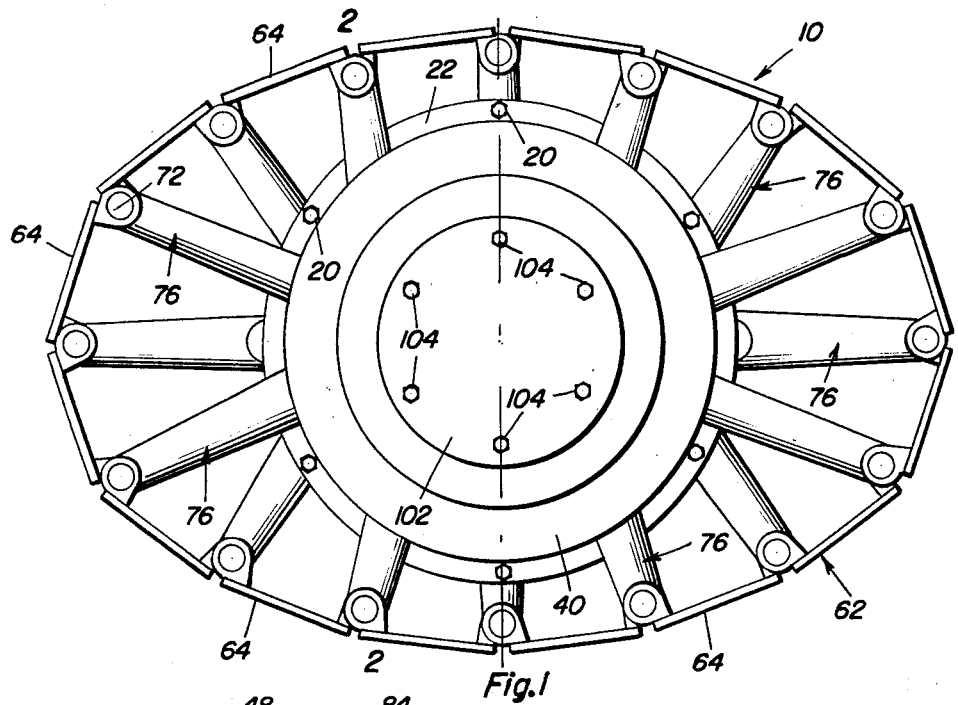
Fig.1
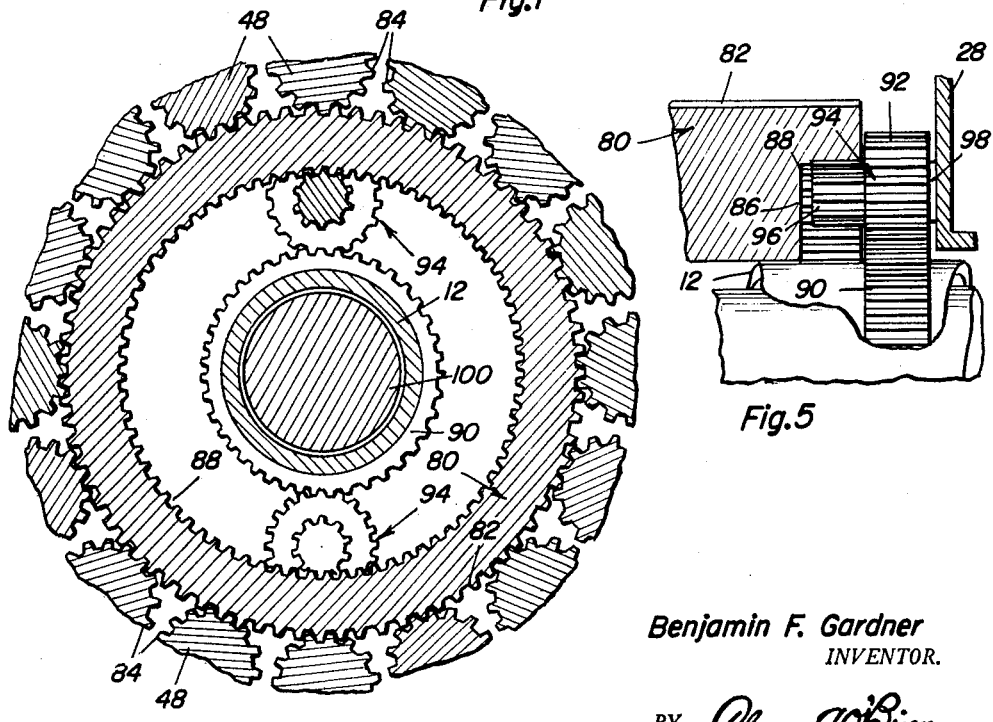
Fig.3
Fig.5
Benjamin F. Gardner
INVENTOR.
BY Clarence A. O'Brien
and Harvey B. Jacobson
Attorneys

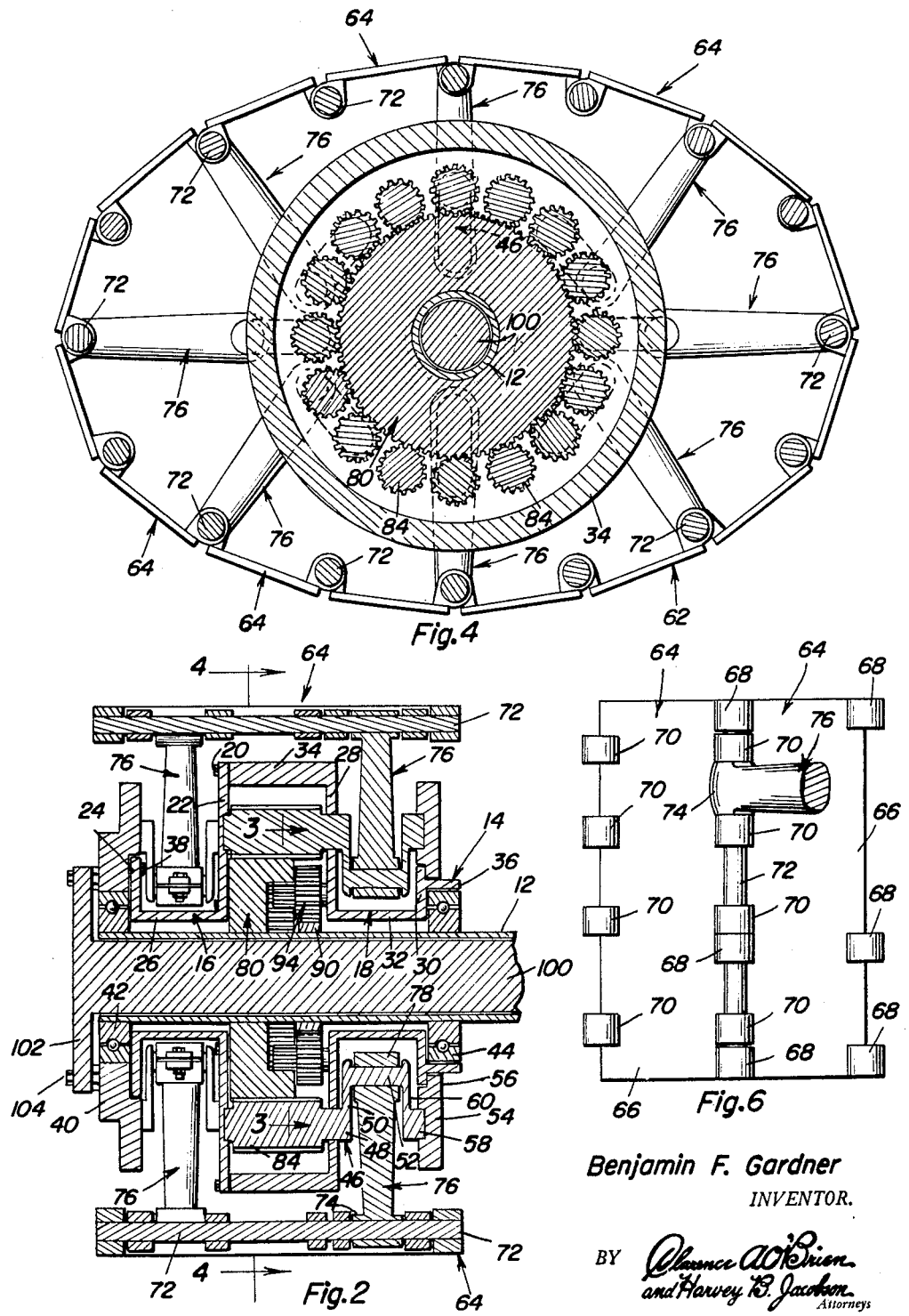

United States Patent Office 2,916,331
Patented Dec. 8, 1959

2,916,331

FLEXIBLE WHEEL

Benjamin F. Gardner, Colorado Springs, Colo.

Application July 16, 1958, Serial No. 748,880

7 Claims. (Cl. 305—19)

This invention relates in general to new and useful improvements in vehicle wheel construction, and more specifically to a vehicle wheel which has a flexible ground engaging portion.

Although the usual tire type wheel has proved to be satisfactory for a majority of operating conditions it has one major disadvantage. This major disadvantage is that the tire does not have sufficient ground contacting surface and as a result when the bearing conditions of the soil on which the wheel rolls is unsatisfactory, the wheel sinks into the ground and thus the vehicle becomes stalled. In order to overcome this, there have been provided endless tracks. However, the endless tracks have a major disadvantage in that they are extremely expensive as compared to tire type wheels. Furthermore, the endless tracks are of a great length and there is the normal tendency for the endless tracks to come off of the supports therefor. When this occasions, the vehicle is stalled and then there is a loss of time and manpower in the replacement of the track.

It is therefore the primary object of this invention to provide a wheel construction which has the normal advantages of an endless track and at the same time retains many of the desirable features of a tire type wheel.

Another object of this invention is to provide an individual wheel assembly for a vehicle, the individual wheel assembly being relatively small in size, the size of the wheel assembly being comparable to that of a tire type wheel which it would normally replace, the wheel assembly having an endless track type tread and there being provided suitable support and drive means for the tread whereby the tread will move about an axis in an elliptical pattern.

Another object of this invention is to provide a vehicle wheel which may be used as a replacement for a tire type wheel, the vehicle wheel including an endless track ground engaging portion, the endless track being supported from a central housing by means of a plurality of spoke-like supporting members and these spoke-like supporting members being so mounted with respect to the central housing whereby the outer ends thereof, which outer ends are connected to the endless track, are moved in an elliptical path.

A further object of this invention is to provide a vehicle wheel, which vehicle wheel has all of the mounting characteristics of a tire type wheel, the vehicle wheel including an endless track type of tread with the endless track type of tread being moved in an elliptical path with the major axis of the elliptical path being disposed generally horizontal whereby a maximum amount of the endless track may engage the ground at one time to provide for a maximum bearing.

A still further object of this invention is to provide a vehicle wheel, the vehicle wheel being of such a construction whereby it has substantially all of the attributes of an endless track construction and at the same time is relatively simple, as compared to an endless track, whereby the cost thereof is such that the wheel is economically feasible.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is an elevational view of the flexible wheel which is the subject of this invention and shows the general outline thereof;

Figure 2 is a fragmentary vertical sectional view taken substantially upon the plane indicated by the section line 2—2 of Figure 1 and shows the internal construction of the vehicle wheel including the mounting of the vehicle wheel on a spindle;

Figure 3 is an enlarged fragmentary sectional view taken substantially upon the plane indicated by the section line 3—3 of Figure 2 and shows the specific details of the drive means for the endless track of the vehicle wheel;

Figure 4 is a transverse sectional view taken substantially upon the plane indicated by the section line 4—4 of Figure 2 and shows the specific arrangement of the supporting members for the endless track and the manner in which the outer ends of the supporting members are moved in an elliptical path;

Figure 5 is an enlarged fragmentary sectional view taken through the central part of the vehicle wheel and shows the specific drive between the spindle and a drive gear for the supporting members; and Figure 6 is an enlarged fragmentary sectional view taken through the endless track and shows both the construction of the endless track and the manner in which one of the supporting members is connected to the endless track.

Referring now to the drawings in detail, it will be seen that there is illustrated the wheel construction which is the subject of this invention, the wheel being referred to in general by the reference numeral 10. The wheel 10 is mounted on a fixed spindle 12, which spindle 12 will vary in its construction depending upon the position and use of the wheel on a vehicle. The wheel 10 includes a centrally located housing which is referred to in general by the reference numeral 14. The housing 14 is of at least a two-piece construction and includes housing members 16 and 18. The housing members 16 and 18 are of a different construction and are connected together by a plurality of bolts 20. The housing section 16 is generally channel-shaped in cross-section and includes an inner vertical portion 22 and an outer vertical portion 24, the inner vertical portion 22 being of a greater extent than the outer vertical portion 24. The vertical portions 24 and 22 are connected together by an annular intermediate portion 26.

The housing section 18 includes an inner vertical portion 28 and an outer vertical portion 30. The vertical portions 28 and 30 are disposed in parallel relation and are connected by an annular portion 32. The inner vertical portion 28 has extending therefrom concentrically of the spindle 12 a connecting portion 34 to which the vertical portion 22 is secured by means of the bolts 20. Extending from the outer vertical portion 30 is a mounting flange 36.

Secured to the vertical portion 34 by means of bolts 38 is a mounting ring 40. The mounting ring 40 has seated in it a bearing 42 which facilitates the rotatable journaling of the housing 14 on the spindle 12. Seated in the mounting flange 36 is a second bearing 44 which is carried by the spindle 12 and cooperates with the bearing 42 to mount the housing 14 on the spindle 12 for rotation. Incidentally, although ball bearings 42 and 44 have been illustrated, the bearings may be of any construction depending upon the load to be placed thereupon.

The wheel 10 includes a plurality of cranks, each of which is referred to in general by the reference numeral 46. Each crank 46 includes a journal 48 which extends between and is rotatably journaled in the vertical portions 22 and 28. Connected to the journal portion 48 is a crank arm 50 which in turn supports a throw 52.

There also has been provided a mounting ring 54 which is secured to the vertical portion 30 by means of a plurality of bolts 56 which are circumferentially spaced. The crank 46 also includes a second journal 58 which is rotatably journaled in the mounting ring 54 and which is connected to the throw 52 by means of a crank arm 60. Depending upon the load to be placed upon the crank 46, the mounting ring 54, the throw 58 and the crank arm 60 may be varied or eliminated.

The wheel 10 also includes an endless track which is referred to in general by the reference numeral 62. The endless track 62 includes a plurality of individual track sections 64 which are identical. Each of the track sections 64 includes a plate portion 66 adapted to engage the ground or other supporting surface. Disposed along a first edge of the plate portion 66 is a plurality of eyes 68. Disposed along the opposite edge of the plate 66 is a second series of eyes 70. The eyes 68 and 70 are disposed out of alignment longitudinally of the endless track 62 and may be disposed in transverse alignment. When the eyes 68 and 70 are in transverse alignment, a pin 72 may be passed therethrough, as is shown in Figure 6, to connect together the individual sections 64 to the endless track 62.

Connected to each of the pins 72 is an outer end 74 of a spoke-like supporting member 76. The spoke-like supporting member 76 has an inner end 78 which is journaled on the throw 52 of its respective crank 46. At this time it is pointed out that the cranks 46 extend both to the right and the left of the center part of he housing 14, as appearing in Figure 2. The journals 58 of the cranks disposed to the left of the central part of the housing 14 are rotatably journaled in the mounting ring 40.

The cranks 46 are alternating in their direction to opposite sides of the central portion of the housing 14. Thus the supporting members 76 are alternately connected to the endless track 62 adjacent opposite edges thereof. This is best illustrated in Figure 2.

In order that the wheel 10 may function as is desired, it is necessary that the outer ends 74 of the supporting members 76 follow an elliptical path. In order to accomplish this, it is necessary that there be provided a suitable drive means for the cranks 46. As is shown in Figure 4, if the outer end 74 of the supporting members 76 are to travel in an elliptical path so that the endless track 62 will assume an elliptical shape at all times, it is necessary that the inner ends 78 of the supporting members vary in distance from the center of the spindle 12. If the ellipse is to have the major axis thereof horizontally disposed, when the supporting members 76 are vertically disposed, the inner ends 78 thereof must be nearest to the axis of the spindle 12 and when the supporting members 76 are horizontally disposed, the inner ends 78 thereof must be disposed a maximum distance from the center of the spindle 12. In order to accomplish this, there must be provided suitable drive means for the cranks 46.

Illustrated in Figures 2 through 5, inclusive, is a preferred form of drive means. This drive means includes a ring gear 80 which is rotatably journaled on the spindle 12. The ring gear 80 includes an outer gear portion 82 which is meshed with a gear 84 carried by the journal 48 intermediate the vertical portions 22 and 28. The ring gear 80 is also recessed as at 86 and includes an internal gear portion 88.

Secured to the spindle 12 is a fixed gear 90. The fixed gear 90 is meshed with a first gear 92 of a two-part gear 94. The gear 94 includes a second gear 96 which is meshed with the internal gear 88. The two-part gear 94 is rotatably journaled on a shaft 98 which is carried by the vertical portion 28. As is shown in Figure 3, there will be at least two of the two-part gears 94. If desired, additional gears 94 may be provided.

It is to be understood that the ratio of drive from the gear 90 through the gear 92, the gear 96, the gear 88, and the gear 82 to the gear 84 must be such that for each revolution of the housing 14 about the spindle 12, the cranks 46 make two revolutions. This will result in the movement of the outer ends 74 of the supporting member 76 following a generally elliptical path.

In the use of the wheel 10, the track 62 will naturally resist its movement due to its contact with the ground or other supporting surface. As a result, when there is a resultant force, either that of a drive axle or horizontal movement of the spindle relative to the ground, which causes rotation of the housing 14 about the spindle 12, the drive train for the cranks 46 will be actuated so as to rotate the cranks 46 simultaneously with the rotation of the housing 14 about the spindle 12. This in turn will result in the actuation of the support members 76 so as to cause the effective movement of the endless track 62 in a generally elliptical path with the major axis thereof disposed horizontally.

The spindle 12 has been illustrated as being tubular and in the form of a rear axle housing. Suitably journaled within the spindle 12 for rotation is a drive axle 100. The drive axle 100 has a drive flange 102 which is secured to the mounting ring 40 of the housing 14 by means of a plurality of bolts 104 so as to rotate the housing 14 about the spindle 12. It is to be understood that the spindle 12 and the drive axle 100 will be of the same type as that presently used on trucks. Thus, the wheel 10 may be readily mounted either as a front wheel of a truck or as a rear wheel of a truck without any adaptation whatsoever to the truck.

Although the endless track 62 has been illustrated as being of the type having metal plates for engaging the ground, it is to be understood that a suitable resilient tire could be provided on the under endless track 62 so that the vehicle could be readily adaptable to both the roadways and open terrain. Also, while the major axis of the elliptical path through which the components of the endless track pass is illustrated as being horizontal, by initially varying the positions of certain of the gears of the drive train, the major axis of the elliptical path could be vertically disposed. Furthermore, it is envisioned that suitable adjusting means could be provided so as to control or vary the relationship of the gears and drive train whereby the axles of the vehicle could be raised or lowered by varying the position of the major axis of the ellipse in question as is desired.

In the operation of a back wheel of a vehicle employing the wheels 10, the axle 100 is driven in the customary manner. Inasmuch as the flange 102 of the axle 100 is connected to the housing 14 by means of a plurality of bolts 104 extending through the drive flange 102 of the axle and the mounting ring 40 of the housing, as the axle 100 is rotated, the housing 14 is likewise rotated. As the housing 14 rotates about the spindle 12, the two part gear 94 has the part 92 thereof meshed with the fixed gear 90 on the spindle 12. This results in the rotation of the two part gear 94. As the two part gear 94 rotates, the part 96 thereof which is meshed with the internal gear 88 of the ring gear 80 is driven. The rotation of the ring gear 80 results in the relative turning movement between the outer gear portion 82 thereof and the gears 84 of the cranks 46. Thus as the housing 14 rotates and in turn carries with the supporting members 76 and the endless track 62, the supporting members 76 have their inner ends reciprocated by the cranks 46 so that the endless track 62 is continuously deformed to retain the elliptical shape illustrated in Figure 4. By so retaining the elliptical shape of Figure 4, the endless track 62 at all times presents a relatively elongated contact surface with the ground. This, of course, is the desired result of the invention.

From the foregoing, it will be readily apparent that there has been devised a flexible wheel which incorporates all of the advantages of an endless track and at the same time is readily adaptable as a replacement for a tire type vehicle wheel. Furthermore, while the wheel 10 is obviously more complex than the usual type wheel, it is of a much greater simplicity than the normal endless track type of support for a vehicle and therefore the cost thereof is much less than that of an endless track. In fact, when the endless wheel 10 is mass produced, the cost thereof would only be a fraction of the cost of an endless track. Furthermore, because of the fact that the endless track 62 is permanently connected to the remaining parts of the wheel 10, it is impossible for the track 62 to come off of the mounting except through the breakage of the track.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A flexible wheel assembly comprising a spindle, a housing, bearing means rotatably journalling said housing on said spindle, an endless track disposed about said housing, a plurality of supporting members having outer ends connected to said endless track, and drive means carried by said housing and connected to inner ends of said supporting members for moving said supporting members outer ends in a generally elliptical path.

2. A flexible wheel assembly comprising a spindle, a housing, bearing means rotatably journalling said housing on said spindle, an endless track disposed about said housing, a plurality of supporting members having outer ends connected to said endless track, and drive means carried by said housing and connected to inner ends of said supporting members for moving said supporting members outer ends in a generally elliptical path, said drive means including a crank for each of said supporting members, said cranks being rotatably journaled in said housing.

3. A flexible wheel assembly comprising a spindle, a housing, bearing means rotatably journalling said housing on said spindle, an endless track disposed about said housing, a plurality of supporting members having outer ends connected to said endless track, and drive means carried by said housing and connected to inner ends of said supporting members for moving said supporting members outer ends in a generally elliptical path, said endless track being formed in a plurality of sections, pins pivotally connecting together said sections, said supporting member outer ends being connected to said pins.

4. A flexible wheel assembly comprising a spindle, a housing, bearing means rotatably journalling said housing on said spindle, an endless track disposed about said housing, a plurality of supporting members having outer ends connected to said endless track, and drive means carried by said housing and connected to inner ends of said supporting members for moving said supporting members outer ends in a generally elliptical path, said endless track being formed in a plurality of sections, pins pivotally connecting together said sections, said supporting member outer ends being connected to said pins, said drive means including a crank for each of said supporting members, said cranks being rotatably journaled in said housing.

5. A flexible wheel assembly comprising a spindle, a housing, bearing means rotatably journalling said housing on said spindle, an endless track disposed about said housing, a plurality of supporting members having outer ends connected to said endless track, and drive means carried by said housing and connected to inner ends of said supporting members for moving said supporting members outer ends in a generally elliptical path, said drive means including a crank for each of said supporting members, said cranks being rotatably journaled in said housing, gearing extending between said spindle and said cranks, said gearing including a fixed gear on said spindle and a gear on said crank.

6. A flexible wheel assembly comprising a spindle, a housing, bearing means rotatably journalling said housing on said spindle, an endless track disposed about said housing, a plurality of supporting members having outer ends connected to said endless track, and drive means carried by said housing and connected to inner ends of said supporting members for moving said supporting members outer ends in a generally elliptical path, said drive means including a crank for each of said supporting members, said cranks being rotatably journaled in said housing, gearing extending between said spindle and said cranks, said gearing including a fixed gear on said spindle and a gear on said crank, and reduction gearing intermediate said spindle gear and said crank gear.

7. A flexible wheel assembly comprising a spindle, a housing, bearing means rotatably journalling said housing on said spindle, an endless track disposed about said housing, a plurality of supporting members having outer ends connected to said endless track, and drive means carried by said housing and connected to inner ends of said supporting members for moving said supporting members outer ends in a generally elliptical path, said spindle being in the form of a tubular axle housing, a drive axle extending through said spindle and secured to said housing for rotating said housing on said spindle.

References Cited in the file of this patent

UNITED STATES PATENTS

| 902,426 | Martin | Oct. 27, 1908 |
| 1,035,112 | Beard | Aug. 6, 1912 |
| 1,153,845 | Henneuse | Sept. 14, 1915 |
| 1,259,098 | Hilton | Mar. 12, 1918 |